United States Patent [19]
Howe

[11] Patent Number: 5,556,172
[45] Date of Patent: Sep. 17, 1996

[54] BRUSH SEAL BRISTLE CUTTING METHOD

[75] Inventor: Harold Howe, Orlando, Fla.

[73] Assignee: Technetics Corporation, Deland, Fla.

[21] Appl. No.: 240,555

[22] Filed: May 11, 1994

[51] Int. Cl.$^6$ .................................................... A46D 1/08
[52] U.S. Cl. ............................................................. 300/21
[58] Field of Search ...................... 300/21, 2; 228/160, 228/173.5

[56] References Cited

U.S. PATENT DOCUMENTS

| | | | |
|---|---|---|---|
| 3,836,199 | 9/1974 | Blankschein | 300/21 |
| 4,678,113 | 7/1987 | Bridges et al. | 228/160 |
| 4,730,876 | 3/1988 | Werner et al. | 300/2 |
| 4,839,997 | 6/1989 | Pritchard | 51/290 |
| 5,183,197 | 2/1993 | Howe | 228/160 |

Primary Examiner—John M. Husar

[57] ABSTRACT

A method for cutting the bristles which form the sealing ends of a brush seal, in which the tightly packed bristles are infiltrated with a liquid binder which is then hardened to form a rigid composite of bristles and binder. The resulting rigid composite can then easily be machined (cut or ground) without damage to the bristles. For metallic bristles, conventional fine line cutting methods such as single point turning or milling, are employed. Ceramic bristles, are machined by conventional bore grinding. After machining, the binder material may be immediately removed by melting or dissolution. Alternatively, the binder may be left on the bristles to provide protection during subsequent machining or handling procedures. The method provides accurate, smooth cuts while offering a combination of low cost and high production rates.

8 Claims, 1 Drawing Sheet

BRUSH SEAL BRISTLE CUTTING METHOD

TECHNICAL FIELD

This invention relates to the manufacture of brush seals and is particularly directed to an improved method of cutting the free ends of the sealing bristles to achieve a truly even cut. This method is applicable to bristle fibers made from various materials including metals, plastics, and ceramics.

BACKGROUND

Brush seals provide an effective seal against fluid media, in which the tightly packed bristles form a flexible contact, generally with a rotating member. The projecting, free ends of the bristles must be cut evenly and smooth, to provide both enhanced sealing and reduced wear on the surface of the rotating member. Three basic procedures have been employed to achieve such cutting.

One such method, conventional bore grinding of the bristles, is shown in U.S. Pat. No. 4,678,113. In this process, probably the slowest of the three basic methods, a power driven grinding wheel is mounted for axial movement relative to a supported seal member. The seal is rotated while at the same time the grinding wheel is rotated and reciprocated axially to grind the internal bore of the seal. This method is not widely employed since it has been found difficult to maintain a true bore. Additionally, with respect to metal bristles, bore grinding is the slowest of the three known techniques.

The '113 patent also notes that the inner diameter may be finished by tip grinding. The tip grinding process is shown in greater detail in U.S. Pat. No. 4,839,997, the disclosure of which is incorporated herein, by reference. An abrasive tip cutter is used to cut through the bristles in an axial direction and offers the advantage of being the fastest of the three known techniques. However, this method, analogous to conventional hole saw cutting, requires a different diameter hole saw for each different brush seal diameter. A further disadvantage of this type of cutter is the high cost, due to its short useful life. New cutters must be purchased periodically because of rapid wear, which is soon reflected on the finished bore size. The cutter design, itself, is primarily responsible for this wear. Rather than using saw teeth as in the conventional hole saw cutter, cutting is achieved by attaching abrasive grit to the sharp edge of the cutter. Grit adhesion strength on the sharp edge is low because of the small amount of contact between the grit particle and the fine edge—resulting in grit particles breaking free from the substrate edge.

The other method for machining bristles is Electro Discharge Machining, the disadvantages of which are also shown in the '997 patent. A disadvantage of this procedure is its high cost requiring the purchase of an expensive EDM machine—with the expense increasing dramatically for large diameter brush seals. The cutting process is slow, and there is generally a recast layer left by the cutting process, which must subsequently be removed by an abrasive technique—further adding to the cost.

DISCLOSURE OF THE INVENTION

Convention machining techniques, such as single point turning for annularly shaped brush seals, or milling for linearly-shaped brush seals, would be cost effective because such techniques provide rapid material removal rates and use simple, universal tooling. However, these process have not been employed for cutting brush seals, because of the flexibility of the bristles. The problem of such flexibility is recognized in the '997 patent, in which it is suggested that for its "hole-saw" technique, the free ends can be secured by welding, clamping or the use of an adhesive.

In the instant invention, bristle flexibility is overcome by first casting the bristles into a binder and then cutting, utilizing conventional machining techniques such as single point turning, milling or bore grinding—depending on the shape of the seal and the bristle material. A variety of binders can be employed, for example, thermoplastic and thermosetting resins or liquids which are frozen to form a rigid body. After the bristles are cast into a rigid binder/bristle composite, it is then machined. The binder may subsequently be removed by melting, dissolving or burning. In a preferred embodiment, the binder is left on the seal after the machining operation is complete, and is only removed just prior to installation of the seal. This protects the bristles during subsequent backing plate machining (if required) and from further handling and shipping damage. The advantages of this method will become more apparent when read in conjunction with the following more detailed description, the appended claims and the drawings in which:

MODES FOR CARRYING OUT THE INVENTION

A variety of potential binder materials were evaluated. Epoxies tend to work well during the machining process but, in general, are difficult to remove prior to the use of the seal. Waxes are generally easier to remove, but some of the waxes evaluated did not thoroughly infiltrate and wet the fibers—such that upon hardening (cooling) the fibers weren't held in place, well enough to provide smooth accurate cuts during the machining process. Water provides excellent infiltration, but creates an obvious problem associated with the need to handle and machine at temperatures below 0° C. The binder material should therefore have the following properties:

(i) the ability to thoroughly penetrate and wet the interstices of the tightly packed bristles, (ii) as a result of hardening, it should form a rigid composite which holds bristles in place and is rigid enough to withstand the force exerted by the cutting tool, (iii) be readily removable—either by chemicals or by the application of heat, and in a preferred embodiment (iv) it will not degrade under the conditions and environments it would see prior to actual installation.

Examples of materials which offer an optimum combination of the above criteria, are:

(i) Cyanoacrylate adhesives, commonly known as super glue (sold under trademarks such as LOCTITE 400 Series and PERMABOND 900 Series) offer excellent penetration into the interstices of the tightly packed bristles. As a result of good wetting characteristics, upon subsequent hardening the bristles are held in place, and the resulting composite of bristles and adhesive is hard and rigid enough such that machining can readily be accomplished. These adhesives are readily removed by chemicals or heat.

(ii) Mounting waxes, such as are commonly used in lapidary work (sold under various trademarks, such as QUICK STICK 135) provide excellent infiltration and penetration when melted, and upon cooling, provide a hard, brittle composite which offers excellent machining characteristics. These mounting waxes have the further advantage that, in addition to easy removability, they are reusable.

Figure 1:
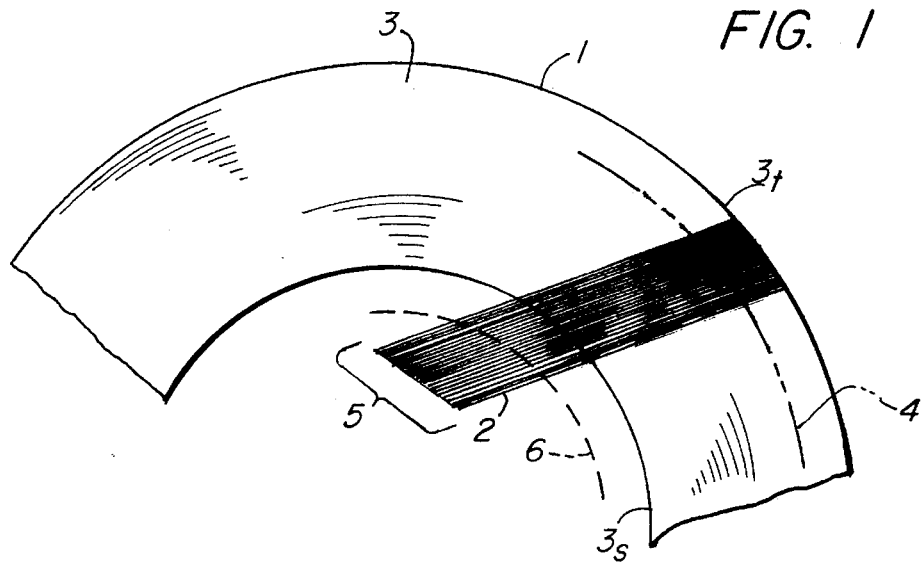
FIG. 1 shows a section of a binder infiltrated, annular brush seal.

Both of the above binder materials have been found to work well with either metallic and ceramic fiber bristles. In the case of ceramic fibers, such as SiC, conventional bore grinding has been found to produce a smooth, end cut bristle. By encapsulating the ceramic bristles, bore grinding speeds can be increased two or threefold, compared with conventional grinding of metallic bristles. Referring to FIG. 1, brush seal 1 is composed of binder impregnated bristles 2 (which would normally be tightly packed) joined to annular plate 3 having two edges $3_s$ and $3_t$. The bristles may be joined to the plate from the trailing edge $3_t$ up to joining line 4,—normally a distance of 0.5 to 3 mm. Where both the bristles and the annular plate are metallic, the bristles will generally be joined to the plate by welding; whereas, in the case of ceramic fiber bristles, the bristles would be joined to the metal plate by use of a braze material. When using a low viscosity binder such as cyanoacrylate adhesives, the liquid may merely be poured onto the bristles and the resulting wicking action will fill all the interstices. When using a thermoplastic material such as mounting wax, the complete brush seal may be dipped into a molten bath of the wax, or the bristles may be surrounded by the solid wax and the mixture placed in an oven to melt and infiltrate the wax. Generally, the liquid will penetrate the entire length of the interstices, from joining line 4 to the free ends of the bristles 5. It should be apparent that penetration along the entire length of the interstices is not required. However, to achieve adequate rigidity during machining, it is desirable that the liquid penetrate a length from sealing edge $3_s$ to a distance somewhat further from that edge than cutting line 6, which defines the final, working length of the bristles.

Figure 2:
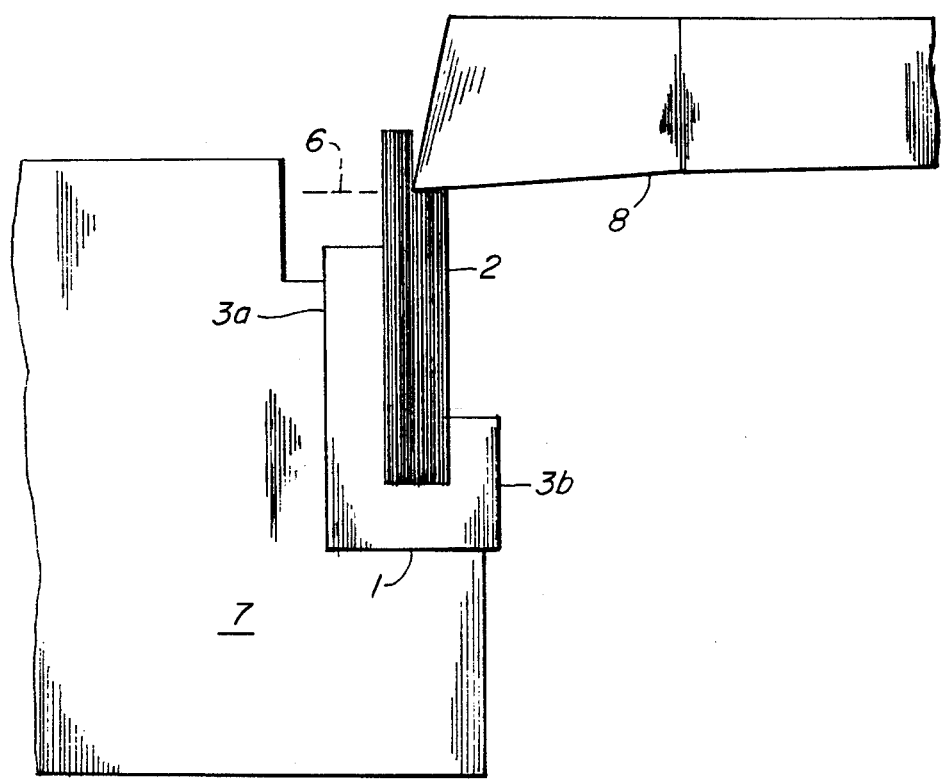
FIG. 2 is a cross-sectional view illustrating the basic components for single point turning of bound bristles on a lathe.

When cutting the bristles of an annularly shaped, metallic bristle, brush seal, single point turning on a lathe, as shown in FIG. 2, will be most effective. The seal 1, composed of binder impregnated bristles 2 joined to annular plates 3a and 3b, is held within the chuck 7 of a lathe (not shown). As in the case of conventional turning, chuck 7 is rotated at high speed while single point cutting tool 8 is advanced in the direction of the arrow, to cut the bound bristles at line 6. A lathe arrangement would, of course, not be useful for cutting a linear brush seal. In the latter case, an analogous fine cut line could be achieved by a thin, multifluted cutter.

I claim:

1. In the manufacture of a brush seal, comprising a plate having a plurality of bristles joined to and projecting from an edge of the plate, wherein the free ends of the bristles are machined evenly and smoothly to provide enhanced sealing, said plate being held in-place during the machining operation, the improvement which comprises, after said bristles are joined to the plate, infiltrating a liquid binder material into the linear interstices formed by said packed bristles, such that the interstices are filled with the liquid at least from said edge of the plate to a distance beyond the desired working length of the bristles, causing the liquid to harden and form a rigid, monolithic composite of bristles and infiltrated binder material, and machining the composite along a line defining the desired working length of the bristles.

2. The method of claim 1, in which the liquid penetrates substantially all of the interstices of the packed bristles, up to the point where the bristles are joined to the plate.

3. The method of claim 1, in which said binder material is selected from cyanoacrylate adhesives and mounting waxes.

4. The method of claim 3, in which said bristles are composed of ceramic fiber.

5. The method of claim 4, in which said fibers are composed of SiC, and said machining is accomplished by bore grinding.

6. The method of claim 1, in which said bristles are composed of metal wires and said plate is annularly shaped, such that the metallic bristles radially project from the sealing edge of said plate and said machining is accomplished by single point turning.

7. The method of claim 1, in which said plate is metallic and said binder material is selected from cyanoacrylate adhesives and mounting waxes.

8. The method of claim 7, in which said bristles are composed of metal wires and said plate is annularly shaped, such that the metallic bristles radially project from the sealing edge of said plate and said machining is accomplished by single point turning.

* * * * *